United States Patent Office

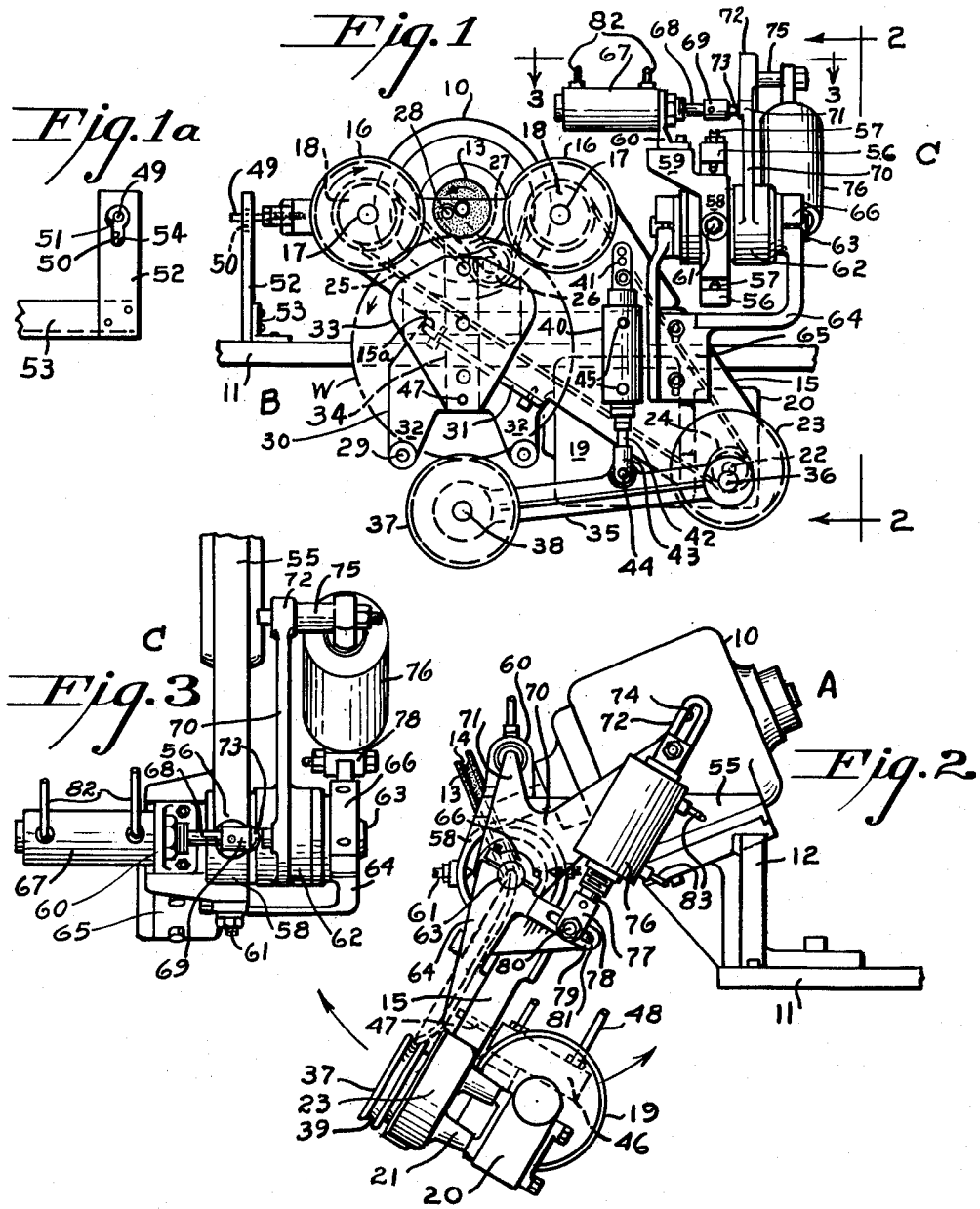

3,186,134
Patented June 1, 1965

3,186,134
EDGE GRINDING
George E. Bonin, Addison, N.Y., assignor to Corning Glass Works, Corning, N.Y., a corporation of New York
Filed Feb. 26, 1962, Ser. No. 175,424
8 Claims. (Cl. 51—283)

This invention relates to the machining of edge portions of a workpiece, and more particularly to a method of and apparatus for finishing peripheral edge portions of circular glass-like articles to form smooth rounded edges thereon.

Most commercial machinery utilized in the production of glass articles have a tendency to form parting lines, flashing, ridges and the like about peripheral portions of the article, which must be removed by a finishing operation before the article can be utilized. In the past, it has been customary to remove such parting lines and finish peripheral edge surfaces of glass articles by conventional fire-polishing methods. The ware is usually fire-polished immediately after formation to take advantage of the residual heat of formation, and in many instances is fire-polished while being retained by a mold part utilized in its manufacture.

Although this known expedient is generally satisfactory for finishing edge surfaces of most glass articles, it is completely unsatisfactory for finishing the surfaces of articles manufactured from the rather recently developed class of materials known as glass-ceramics. In the manufacture of articles from this latter class of materials, the articles as first formed, such as by conventional glass-forming methods, possess glass-like characteristics. However, such articles are subsequently subjected to the application of controlled heat to devitrify and convert their glasseous structure into a semi-crystalline or ceramic-like structure. Accordingly, if fire-polishing techniques were to be utilized to remove parting lines, flashing, and the like from the initially formed articles produced in manufacturing glass-ceramics, the heat produced during the fire-polish would tend to partially ceram or predevitrify a localized area of the initially formed glass-like articles, resulting in subsequent structural failure and breakage during the regular ceramming or crystallizing process.

Further, even if it were possible to fire-polish the initially formed articles, without detrimentally affecting their ultimate structural qualities, fire-polishing has the additional disadvantage of producing a beaded edge on the ware which renders it virtually impossible to provide the ware with a uniform glazing. The beaded edge produces low surface tension therealong, and accordingly only an extremely thin coat of glazing adheres to the beaded portion, thus resulting in an unattractive finished product. In addition, once the article has been subjected to the ceramming or crystallizing process to convert it into a glass-ceramic, it would be impossible to remove a fin or parting line by fire-polishing unless the temperature utilized was above the liquidus; however, the use of such a temperature would set up such a high degree of internal stresses as to produce chipping and structural failure in the ware.

Therefore, realizing the fact that conventional fire-polishing methods could not feasibly be utilized to finish edge portions of articles formed from glass-ceramic materials, I set forth to devise a novel method and apparatus which would not only obviate and solve this finishing problem peculiar to glass-ceramics, but which would also be economically feasible from a commercial standpoint. The parting line or flashing which must be removed is usually formed about an outer peripheral edge of the article, particularly when forming disc-shaped or circular dish-like articles such as are utilized in tableware.

It became apparent that if parting lines and the like were to be removed and peripheral edge portions provided with a smooth rounded surface by machining, two main obstacles had to be overcome before proceeding in this direction. The first problem resided in the fact that when a rounded surface other than a half round is machined or ground by an abrasive member, an edge is inherently produced on the rounded surface at the point of termination of contact with the abrasive means, thus producing an undesirable condition. The second obstacle related to the fact that although the outer peripheries of the articles to be finished may be substantially circular, even a slight out-of-roundness tends to produce uneven grinding when the peripheral edge portions to be surfaced are continuously presented in the usual rigid or fixed relationship to the abrasive member.

A preferred embodiment of the presnt invention set forth and described in detail herein, in its simplest form comprises a revolving abrasive means or rotating grinding wheel for finishing edge portions of a workpiece; a ware chuck or workpiece retaining means for rotating a workpiece and positioning peripheral edge portions thereof in contact with the revolving abrasive means, with the workpiece retained in various selected orientations with respect thereto; and a universal connecting joint or gimbal means which permits the ware chuck to swing from a loading position to an operating position, to pivot a rotating workpiece while in contact with the rotating grinding wheel, and to maintain edge portions of the rotating workpiece in constant contact with the rotating grinding wheel under a predetermined pressure while permitting the workpiece to fluctuate with respect to the grinding wheel to compensate for out-of-roundness which may be present in the outer periphery of the workpiece.

In sequential order of accomplishing the desired improved results obtainable with my novel advancement in the art, the invention includes the positioning of a workpiece on a ware chuck, the rotation of the workpiece retained by the chuck, the positioning of a peripheral edge portion of the rotating workpiece in contact with a rotating grinding wheel with a predetermined pressure, the continued maintenance of such contact with such pressure in such position for a predetermined period of time, the pivoting of the workpiece about an axis tangential to a periphery thereof at the point of contact with the grinding wheel and while in such contact to a second predetermined position, the continued maintenance of contact with the rotating grinding wheel while in such second predetermined position under the aforementioned pressure for a second period of time, the repositioning of the workpiece about the tangential axis back to the first position while maintaining contact with the grinding wheel under the predetermined pressure for a third period of time, and the removal of the rotating workpiece from the rotating grinding wheel.

The pivoting of the workpiece to the various predetermined positions about an axis tangential to the peripheral edge thereof, at the point of contact with the rotating grinding wheel, obviates the formation of a ridge which might otherwise be formed on the peripheral edge of the workpiece by the grinding wheel if the workpiece were merely rotated in contact with the grinding wheel in a single position or orientation with respect thereto. In addition, the preferred embodiment of my invention includes the utilization of a rotating grinding wheel having a concave groove formed in its outer periphery, wherein the groove is of a width greater than the thickness of the peripheral edge of the workpiece being machined, so that a major arcuate surface of the outer periphery of the rotating workpiece is machined during each predetermined position thereof, thus producing an overlapping of the machining in each position to thereby avoid the possibility of forming grinding ridges. Such overlapping of machining is necessary where the cross sectional curvature of the outer peripheral surface to be finished is not provided with a single radius such as is a half round, and accordingly a single pass with a semi-circularly grooved grinding wheel could not contact the entire curvature of the surface so as to provide a smooth finish.

Although the peripheral edge of the rotating workpiece is maintained in constant contact with the rotating grinding wheel with a predetermined pressure during machining, the ware chuck, retaining the rotating workpiece, is maintained in a floating suspension so that the body or center of the rotating workpiece may fluctuate with respect to the peripheral edge of the rotating grinding wheel to compensate for out-of-roundness which may be present in the peripheral edge of the workpiece. Such floating suspension obviates the possibility of overloading the grinding wheel drive shaft or producing excessive and uneven grinding in certain peripheral portions of the out-of-round workpiece, which would otherwise be experienced if the chuck were held in a rigid or fixed position during machining.

It thus has been an object of my invention to obviate the problems heretofore encountered in removing parting lines and the like from articles formed of glass-ceramic materials.

A further object of my invention has been to provide a method of finishing outer peripheral edges of glass-like articles which cannot feasibly be fire-polished without detrimentally affecting the ultimate physical characteristics thereof.

A still further object of my invention has been to provide an improved method of smoothly rounding the peripheral edge portions of a rotating workpiece wherein the workpiece is manipulated between various predetermined positions while the peripheral edge thereof is maintained in constant contact with a rotating grinding wheel having a uniquely preformed outer periphery.

Another object of my invention is to provide an improved method of machining peripheral edge portions of a workpiece to provide smooth rounded edges wherein the peripheral edge of the workpiece is maintained in constant contact with a grinding wheel under a predetermined pressure while the center of the workpiece is allowed to fluctuate with respect to the grinding wheel to compensate for out-of-roundness in the periphery of the workpiece and wherein the workpiece is manipulated about an axis tangential to the peripheral edge of the workpiece, at the point of contact with the grinding wheel, between various positions while in such constant contact with the grinding wheel under the predetermined pressure.

These and other objects of my invention will be apparent to those skilled in the art from the following disclosure and accompanying drawings in which:

FIGURE 1 is a front elevational view of a ware chuck embodying my invention, schemaitcally illustrating the relationship of the grinding wheel with respect thereto when the chuck is in its operating position, and showing the novel gimbal or connecting means utilized to suspend the ware chuck from a supporting frame;

FIGURE 1a is a fragmental side elevational view of a guide arm utilized in cooperation with the gimbal means to guide and support the ware chuck;

FIGURE 2 is a side elevational view taken along line 2—2 of FIGURE 1, with portions of the ware chuck omitted for the purposes of clarity; and, FIGURE 3 is a top plan view of the gimbal means taken along line 3—3 of FIGURE 1.

As shown in the drawings, the apparatus is composed of three main parts including a grinding wheel assembly designated as A, a ware chuck or workpiece retaining assembly designated as B, and a gimbal or connecting joint assembly designated as C. Referring now to FIGURE 2, the grinding wheel assembly A includes an electric drive motor 10 connected to a support frame 11 by means of a mounting bracket 12. A rotating abrasive member 13, preferably in the form of a diamond grinding wheel, is secured to the end of the drive shaft of motor 10. A concave recess or groove 14 is formed in the outer periphery of the wheel 13. The groove 14 is formed with a width greater than the thickness of the edge of the workpiece to be ground, so that the machining surface overlies and operably engages a major arcuate portion of the edge of the workpiece being finished.

The chuck means or workpiece retaining assembly B shown in FIGURES 1 and 2 has a main housing body 15. A pair of ware drive wheels 16, for rotating a workpiece retained by the chuck, are each rotatably mounted forwardly of the housing 15 on a shaft 17 journaled for rotating within the housing. A sheave 18 is secured to the rearward end of each of the shafts 17 within the housing 15. A drive motor 19, having a gear reduction box 20, is secured to a plurality of bosses 21 extending outwardly from a back surface of the housing 15. A drive shaft 22 of the gear reduction box 20 extends into a cylindrical bossed portion 23 of housing 15. A sheave 24 is secured to the drive shaft 22 in transverse alignment with the sheaves 18 positioned in the housing 15. An endless drive belt 25 connects the sheaves 18 with the driven sheave 24 to rotate the drive wheels 16.

A belt adjustment roller 26, for tensioning the belt 25, is rotatably mounted on an adjustable arm 27 pivotally connected to the housing 15 at 28. A ware support bracket 30, having a mounting pad 31, is secured to a mating mounting portion 15a formed on housing 15. The bracket 30 has a pair of downwardly extending leg portions 32, each having a ware support pin 29 extending forwardly thereof for initially supporting lower edge portions of a workpiece delivered to the chuck. A backing member 33, for supporting a back portion of ware initially delivered to the chuck, overlies a portion of the front surface of the housing 15 and ware support 30, and is connected ot such surfaces by a mounting pad 34.

A chucking arm 35 is pivotally mounted at one end on the front surface of the cylindrical bossed portion 23 on housing 15 by means of a shoulder screw 36. A chucking wheel 37 is journaled for rotation on a pin 38 extending through the other end of the chucking arm 35. The wheels 16 and 37 all lie in a common plane, and have peripheral recessed portions 39 for retaining the edge of a workpiece.

An air cylinder 40 is pivotally connected at its upper end to a connecting pad 41 formed on the front face of the housing 15. The air cylinder 40 is provided with an operating piston 42 which has a yoke member 43 secured to the outer end thereof. The yoke member 43 is pivotally connected to chucking arm 35, intermediate its ends, by means of a pivot pin or shoulder screw 44. A pair of air lines 45, connected to the cylinder 40, communicate with a suitable control valve (not shown) which is supplied with a source of fluid under pressure.

An ejector cylinder 46 (see also FIGURE 2) having an ejector plunger or pin 47 extending through backing member 33 and mounting pad 34 to eject a piece of ware from the chuck, is mounted on a back surface of the ware support bracket 30. Connecting lines 48 operably connect the ejector cylinder 46 with suitable valve means (not shown) supplied with a source of fluid under pressure.

The housing 15 has a guide pin 49 projecting outwardly from an upper side edge thereof. The guide pin 49 is positioned for limited travel within an elongated slot 50 (see also FIGURE 1a) having an upper circular recessed portion 51 formed in a guide arm 52 secured to the frame 11 by an angle 53. The lower end 54, of the elongated slot 50, forms a stop abutment portion of the guide pin 49 when the chuck is in its idle or loading position, whereas the circular recessed portion 51 cooperates with the gimbal means to allow the chuck to float when in its operating position.

A workpiece or ware W (indicated in chain lines in

FIGURES 1 and 2) is shown in an operating position, chucked into engagement with the drive wheels 16 by chucking wheel 37, and swung into operating engagement with the rotating grinding wheel 13.

Referring now to the gimbal or connecting joint assembly C, a support bracket 55, connected to the support frame 11 by means of mounting bracket 12, has a yoke-shaped end portion 56. A pair of axially aligned vertically extending pins 57, passing through opposed portions of the yoke-shaped end portion 56, suspend a support ring 58 for rotational movement about the axis of the pins 57. The support ring 58 has an upwardly offset arm 59 having a cylinder support bracket 60 mounted thereon.

A pair of axially aligned horizontally extending pivotal support pins 61, whose axis lies in the same vertical plane as the axis of pins 57 and normal to such axis, extends through transverse sidewall portions of the support ring 58, and support a cylindrical housing 62 for pivotal movement about their horizontally extending axis. The housing 62 contains bearings (not shown) for journaling a pivot shaft 63 about a longitudinal axis extending perpendicular to both the axes of pins 57 and pins 61. A bifurcated chuck support bracket 64 having a chuck mounting pad 65 at its lower end, for mounting the chuck assembly B on the gimbal assembly C, is secured to pivot shaft 63 by means of clamping caps 66.

An air cylinder 67 having a plunger 68, for swinging the ware chuck about the axis of support pins 61 into an operating position and for maintaining edge portions of a workpiece rotatably retained by the chuck in constant contact with grinding wheel 13 with a predetermined pressure, is mounted on the upward offset arm 59 of support ring 58 by means of cylinder support bracket 60. A plate-like flange 70, having a vertical arm portion 71 and an inclined arm portion 72, extends radially outwardly from and is formed integrally with cylindrical housing 62. Vertical arm portion 71 has a wear button 73 in alignment with and engageable by a nose portion 69 on plunger 68. When the cylinder 67 is actuated, the nose portion 69 pushes against wear button 73 to swing the chuck assembly B about the axis of pins 61.

Inclined arm portion 72 has a slotted portion 74 for adjustably mounting a cylinder support bracket 75 thereon. An air cylinder 76, having a plunger 77 with a yoke 78 on the end thereof, is pivotally connected at one end to the cylinder support bracket 75. The yoke 78 on the plunger 77 is adjustably connected to a backwardly extending arm 79 formed integral with the bifurcated chuck support bracket 64, by means of a shoulder screw 80 passing through a slotted portion 81 formed in the arm 79. When the cylinder 76 is actuated, the chuck assembly B is pivoted about the axis of shaft 63, which axis, when the chuck assembly is in its operating position with a workpiece in contact with the grinding wheel 13, is tangential to the periphery of both the workpiece and the grinding wheel at the point of contact, and also passes through the longitudinal center of guide pin 49. Both air cylinders 67 and 76 have air lines 82, 83 respectively, connected to suitable valve means (not shown) which are in communication with a suitable source of fluid under pressure.

In operation, with all of the air cylinders deactivated and the chuck assembly B in its idler or loading position with guide pin 49 resting on the stop abutment end 54 of elongated slot 50, and with the chucking arm 35 and chucking wheel 37 in their lowermost position, a workpiece, such as a dinner plate or the like is loaded onto the chuck with lower peripheral edge portions thereof supported by pins 29 and the back thereof resting against backing member 33. Drive motor 19 is energized to rotate the ware drive wheels 16 by means of belt 25, sheave 24 and drive shaft 22. In addition, motor 10 is energized to rotate the grinding wheel 13. Air cylinder 40 is then actuated to pivot the chucking arm 35 about shoulder screw 36 so that chucking wheel 37 engages a lower periphery of the ware or workpiece to lift it off the support pins 29 and into engagement with drive wheels 16. The drive wheels 16 rotate the ware about a center portion thereof, which in the case of a disc-like or dish-shaped article is about an axis extending substantially perpendicular to the front face thereof. During the rotation of the ware, the chucking wheel 37 operates as an idler wheel and is rotated by the rotational movement imparted to it by the rotating ware.

The cylinder 67 is then actuated under a predetermined pressure to move the nose portion 69 of plunger 68 into engagement with ware button 73 formed integral with the vertical arm portion 71 of flange 70 so as to pivot the cylindrical housing 62 about the axis of the support pins 61 and swing the ware chuck upwardly so that peripheral edge portions of the rotating ware operably engage the peripheral groove 14 of the grinding wheel 13. When the chuck or work retaining means B is moved to its work engaging or operating position, the guide pin 49 moves in elongated slot 50 from its lowermost position on the stop abutment portion 54 into a floating position within the circular recessed portion 51 as shown in FIGURE 1a. The constant pressure applied by cylinder 67 maintains the peripheral edge portions of the workpiece in constant contact with the grinding wheel 13 under a predetermined pressure, while support pins 57 and 61, together with guide pin 49 and circular recessed portion 51, permit the central portion of the workpiece to fluctuate with respect to the grinding wheel to compensate for out-of-roundness which may be present in the outer periphery of the workpiece.

After a peripheral edge portion of the rotating workpiece applied to the grinding wheel has been ground for a predetermined period of time, which may be two complete revolutions of the workpiece, air cylinder 76 is actuated to pivot the chuck assembly B and accordingly the workpiece while in contact with the grinding wheel, about the axis of shaft 63 which is tangential to the periphery of the grinding wheel and the rotating workpiece at the point of contact, to a new predetermined position wherein another portion of the peripheral edge is applied to the grinding wheel. Grinding is continued under the constant pressure of cylinder 67 for a second predetermined period of time, which may also be two complete revolutions of the workpiece, and then cylinder 76 is de-energized to pivot the chuck B and accordingly the workpiece, about the tangential axis of shaft 63, back to the first position wherein grinding may be continued for a third predetermined period of time, which may be one revolution on the workpiece. The pivoting action about the axis of shaft 63 between the first and second predetermined positions is accomplished while the workpiece is rotating in constant contact with the grinding wheel 13 under the constant pressure applied by cylinder 67.

Cylinder 67 is then de-energized and the chuck assembly B allowed to swing around pins 61 back to its idler or loading position with the guide pin 47 abutting the stop abutment portion 54 of slot 50, to limit the downward swinging movement of the chuck B. Air cylinder 40 is then deactivated to allow chucking arm 35 and chucking wheel 37 to drop downwardly to its loading position, wherein the ware or workpiece falls away from the drive wheels 16 and rests upon pins 29. Ejector cylinder 46 is then momentarily activated to push ejector pin or plunger 47 forwardly to eject the ware from the ware chuck B, and of course motors 10 and 19 are de-energized.

A coolant is preferably applied to the grinding wheel during grinding in the vicinity of the ware to prolong the life of the wheel.

Although I have disclosed a preferred embodiment of my invention it will be apparent to those skilled in the art that various changes and modifications may be made thereto without departing from the spirit and scope of the appended claims.

I claim:

1. A method of producing a smooth rounded edge portion on glass-like articles to be converted into glass ceramic articles which comprises, rotating an article having a substantially circular peripheral surface about an axis passing through a central portion thereof, relatively moving the rotating article into contact with a revolving abrasive member, maintaining peripheral edge portions of the rotating article in constant contact with the revolving abrasive member with a constant predetermined pressure while permitting the axis of rotation of the article to be relatively displaced with respect to the contacted portion of the revolving abrasive member to compensate for irregularities in the peripheral surface of the rotating article, and while in contact with the revolving abrasive member pivoting the article about an axis tangential to the periphery of the rotating article at the point of contact with the revolving abrasive member to a new predetermined position, continuing maintaining the rotating article in contact with the revolving abrasive member while in such new position with the predetermined pressure, and relatively removing the rotating article from contact with the revolving abrasive member.

2. A method of finishing rounded peripheral edge portions of dish-shaped articles and the like which comprises rotating a dish-shaped article about an axis extending normal to a face of the article, relatively moving the rotating dish-shaped article so that a peripheral edge portion thereof contacts a driven abrasive means in a predetermined orientation, maintaining the rotating dish-shaped article in contact with the driven abrasive means while in such predetermined orientation for a selected period of time, relatively pivoting the rotating dish-shaped article about an axis tangential to the edge portion of the article in contact with the driven abrasive means to a second predetermined position, maintaining the rotating dish-shaped article in contact with the driven abrasive means while in the second predetermined position for another selected period of time, and relatively removing the rotating dish-shaped article from contact with the driven abrasive means.

3. A method of edging glass articles which are readily devitrifiable upon the application of heat and accordingly cannot feasibly be fire polished which comprises, rotating an article having a substantially circular outer periphery about an axis extending normal to a face terminating in such outer periphery, relatively moving a peripheral edge portion of the rotating article into arcuate contact with the periphery of a rotating abrasive wheel, maintaining the edge portion in arcuate contact with the periphery with a particular positional orientation and under a substantially constant predetermined pressure for a pre-selected period, pivoting the rotating article while in contact with the periphery and under the predetermined pressure about an axis which is substantially tangential to both the edge portion of the rotating article and the periphery at the point of contact therebetween to a second predetermined position, continuing the maintenance of contact between the rotating article and the periphery under the predetermined pressure for a second selected period of time, and relatively removing the rotating article from such peripheral arcuate contact.

4. A method of surfacing glass-like articles which are amenable to conversion into semi-crystalline articles upon the application of controlled heat which comprises, rotating a glass-like article about an axis perpendicular to a planar face thereof; positioning an outer peripheral edge of the rotating article in contact with the periphery of a rotating grinding wheel; abrasively engaging an arcuate portion of such peripheral edge, maintaining the edge portion of the rotating article in selected arcuate engagement with the periphery of the grinding wheel for a period of time and then while in such engagement pivoting the rotating article about an axis tangential to an edge portion thereof to a new position; continually maintaining a newly presented arcuate edge portion in engagement with the periphery of the rotating grinding wheel for a second period of time; and removing the periphery of the rotating article from arcuate engagement with the periphery of the grinding wheel.

5. A method of producing smooth rounded edges on dish-shaped glass-like articles whose peripheries may be slightly out of round which comprises, rotating a dish-shaped glass-like article about an axis extending perpendicularly to a face of the article substantially centrally thereof, applying a peripheral edge portion of the rotating article to a rotating grinding wheel having a concave outer peripheral groove of greater width than the edge of the article being rounded, maintaining the edge portion of the rotating article in contact with the concave peripheral groove with a constant predetermined pressure while permitting the axis of rotation of the article to be relatively displaced with respect to the peripheral groove portion to compensate for irregularities and out of roundness in the periphery of the rotating article, after a selected period of time pivoting the rotating article while in constant contact with the peripheral groove under the predetermined pressure about an axis substantially tangential to the edge portion of the rotating article in contact with the peripheral groove at the point of contact with the peripheral groove at the point of contact to a new position, continuing the maintenance of contact between the newly presented edge portion and the peripheral groove under the constant predetermined pressure for another selected period of time, returning the article back to its original position while maintaining it in constant contact with the peripheral groove under the predetermined pressure, and after a period of time removing the peripheral portion of the rotating article from the peripheral groove of the rotating grinding wheel.

6. A method of finishing rounded peripheral edge portions of dish-shaped articles and the like which comprises rotating a dish-shaped article about an axis normal to a face of the article, relatively moving the rotating dish-shaped article so that a peripheral edge portion thereof contacts a driven abrasive means with a predetermined positional orientation, maintaining the rotating dish-shaped article in contact with the driven abrasive means while in such predetermined orientation for a selected period of at least two revolutions of the article, relatively pivoting the rotating dish-shaped article about an axis tangential to the edge portion of the article in contact with the driven abrasive means to a second predetermined position, maintaining the rotating dish-shaped article in contact with the driven abrasive means while in the second predetermined position for a second selected period of at least two revolutions of the article, again relatively pivoting the rotating dish-shaped article about the tangential axis back to the first predetermined orientation, maintaining the rotating dish-shaped article in contact with the driven abrasive means after being returned to the first predetermined orientation for a third selected period of at least one revolution of the article, and relatively removing the rotating dish-shaped article from contact with the driven abrasive means.

7. A method of machining peripheral edge portions of glass articles and the like which comprises, rotating a glass-like article having a substantially circular outer periphery in a manner so that the outer peripheral edge portions of the article revolve in a substantially common circular path, relatively moving the rotating article into contact with a driven abrasive means with the article in a first predetermined position with respect to the abrasive means, maintaining peripheral edge portions of the rotating article in contact with the driven abrasive means while in such first predetermined position for a selected period and with a substantially constant predetermined pressure while permitting the central portion of the rotating article to fluctuate with respect to the driven abrasive means to compensate for out-of-roundness which may be present in the outer periphery of the rotating article, relatively pivoting the rotating article about an axis tangential to the edge portion of the article in contact with the driven abrasive means to a second predetermined position, maintaining the rotating article in contact with the driven abrasive means under the constant predetermined pressure while in the second predetermined position for a second selected period, again pivoting the rotating article about the tangential axis to the first predetermined position, maintaining the rotating article in contact with the driven abrasive means under the predetermined pressure after returning to the first predetermined position for a third selected period, and relatively removing the rotating article from contact with the driven abrasive means.

8. A method of producing smooth rounded edge portions on glass-like articles to be converted into glass-ceramic articles which comprises, rotating an article having a substantially circular peripheral surface about an axis passing through a central portion thereof, relatively moving the rotating article while in a given position into contact with a revolving abrasive member, maintaining peripheral edge portions of the rotating article in constant contact with the revolving abrasive member with a predetermined pressure while permitting the axis of rotation of the article to move laterally relative to the contact with the revolving abrasive member to compensate for irregularities in the peripheral surface of the rotating article, pivoting the article while in contact with the revolving abrasive member about an axis tangential to the periphery of the rotating article at the point of contact with the revolving abrasive member to a new predetermined position, continuing the maintaining of the rotating article in contact with the revolving abrasive member with the predetermined pressure while in such new position, pivoting the article about the tangential axis back to its original position while maintaining the rotating article in constant contact with the revolving abrasive member with a predetermined pressure, and relatively removing the rotating article from contact with the revolving abrasive member.

References Cited by the Examiner
UNITED STATES PATENTS

| | | | |
|---|---|---|---|
| 817,770 | 4/09 | Sachs | 51—97 |
| 1,804,347 | 5/31 | Krug | 51—105 XR |
| 2,021,198 | 11/35 | Owen | 51—103 |
| 2,057,844 | 10/36 | Owen | 51—103 |
| 2,320,235 | 5/43 | Hjarpe et al. | 51—97 |
| 2,351,881 | 6/44 | Schottland | 51—236 XR |
| 2,778,170 | 1/57 | Flanders | 51—283 |
| 2,910,813 | 11/59 | De Vore | 51—283 |
| 2,966,010 | 12/60 | Guignard | 51—33.1 |

LESTER M. SWINGLE, *Primary Examiner.*

J. SPENCER OVERHOLSER, *Examiner.*

UNITED STATES PATENT OFFICE
CERTIFICATE OF CORRECTION

Patent No. 3,186,134                          June 1, 1965

George E. Bonin

It is hereby certified that error appears in the above numbered patent requiring correction and that the said Letters Patent should read as corrected below.

Column 3, line 56, for "schemaitcally" read -- schematically --; column 4, line 38, for "ot" read -- to --; line 40, for "on" read -- of --; column 8, line 26, strike out "with the peripheral groove at the point of contact".

Signed and sealed this 28th day of December 1965.

(SEAL)
Attest:

ERNEST W. SWIDER                          EDWARD J. BRENNER
Attesting Officer                            Commissioner of Patents